United States Patent [19]

Thornsburg

[11] Patent Number: 5,489,120
[45] Date of Patent: Feb. 6, 1996

[54] COUPON ORGANIZER

[76] Inventor: Bettie A. Thornsburg, 512 Chisolm Ct., Colleyville, Tex. 76034

[21] Appl. No.: 349,192
[22] Filed: Dec. 5, 1994
[51] Int. Cl.⁶ .................................................. A47B 23/00
[52] U.S. Cl. ........................ 281/33; 281/29; 281/31; 281/36; 281/37; 402/73
[58] Field of Search ................................ 281/29, 31, 33, 281/36, 37; 402/70, 73

[56] References Cited

U.S. PATENT DOCUMENTS

| 3,121,576 | 2/1964 | Schade | 281/33 |
| 4,015,863 | 4/1977 | Holum | 281/33 |
| 4,552,479 | 11/1985 | Nickow et al. | 281/33 X |
| 4,603,995 | 8/1986 | Vilona | 402/73 |
| 4,954,003 | 9/1990 | Shea | 281/31 X |
| 5,294,208 | 3/1994 | Tremmel, Jr. et al. | 402/73 X |

Primary Examiner—Willmon Fridie, Jr.
Attorney, Agent, or Firm—W. J. Scherback

[57] ABSTRACT

A discount coupon organizer for storing and displaying discount coupons redeemable at grocery stores including a breakback notebook having a back and two (2) sides and configured when in an open condition to fit within the child's seat of a grocery shopping cart. A multi-ring structure is mounted to the notebook and a plurality of plastic sheets are supported on the ring structure. Each of the plastic sheets is provided on both sides with a plurality of clear plastic pockets for receiving and viewing discount coupons. The binder sides and back are divided into upper and lower portions which are at least partially foldable upon each other. The ring structure is secured only to the upper portion of the back and a strap is connected to a lower portion of the ring structure and to the lower portion of the binder to limit the movement between the upper and lower portions of the binder and thus to provide structure for enabling the binder to be self-supporting on a level surface.

5 Claims, 4 Drawing Sheets

COUPON ORGANIZER

BACKGROUND OF THE INVENTION

1. Field of the Invention

This invention relates to an organizer, and more particularly an organizer primarily for storing and indexing coupons, which supportable by a shopping cart while shopping, but which may also be used for storing and indexing other items such as credit cards, checks, etc.

2. Description of the Prior Art

The use of coupons to obtain discounts on products, particularly for groceries, is quite common. Coupons are received from a wide variety of sources for packaged products of all types. These sources include the mail, newspapers, and at the point of purchase in the store and on the product itself. Billions of coupons are distributed to the public each year. Due to the wide diversity of coupons for many brands of products, the consumer finds it very difficult and nearly impossible to organize these coupons in a manner for quick and easy use while shopping.

Currently on the market are purse-like holders and index boxes with labeled divider cards to assist the consumer in the task of separating and storing the coupons in an easy-to-use fashion of the type shown in U.S. Pat. No. 4,312,393 and U.S. Pat. No. 4,591,054. The problem with such holders is that one can not readily see the coupons while shopping and must look through many coupons to obtain the desired one. Furthermore, with the exception of U.S. Pat. No. 5,038,986, such items are not attachable to the shopping cart or adequately secured in the holder and thus are subject to be spilled by the consumer or by a child in the shopping cart safety seat. The coupon organizer of U.S. Pat. No. 5,038,986 is attached at it's top to a shopping cart handle. This renders the coupon organizer difficult to view since it depends downwardly from the handle and is below the eyesight of the consumer. This renders the organizer inconvenient to use inasmuch as the consumer must squat to read the coupons or physically raise the coupon organizer to a horizontal position to read and to remove coupons.

SUMMARY OF THE INVENTION

The present invention comprises a coupon organizer for storing and displaying discount coupons redeemable at grocery stores, comprising a break-back notebook having a back and two (2) sides and configured when in an open condition to fit within a child seat of a grocery shopping cart. Multi-ring structure is mounted to the back of the binder. A plurality of clear plastic sheets are supported on the ring structure and each is provided on both sides with pockets for receiving and viewing discount coupons. The notebook's sides and back are divided into upper and lower portions which are at least partially foldable upon each other, with the ring structure being secured only to the upper portion of the back. A strap connects a lower portion of the ring structure with the lower portion of the back such that when the binder is moved to an open position the strap limits the movement and provides a free-standing structure.

The coupon organizer of the present invention also includes hard paper separators to divide the plastic sheets into groups and upon which are imprinted the names of items available at grocery stores.

One object of the present invention is to provide a coupon organizer freely supported upon structure of a grocery shopping cart.

Another object of the present invention is to provide a free standing coupon organizer in which coupons readily may be loaded into and removed from said organizer.

A further object of the present invention is to provide separators which divide coupons into groups and having imprinted thereon the names of items available at grocery stores.

Yet another object of the present invention is to provide a plurality of clear plastic sheets provided on both sides with pockets for receiving and viewing discount coupons.

DETAILED DESCRIPTION

Figure 1:
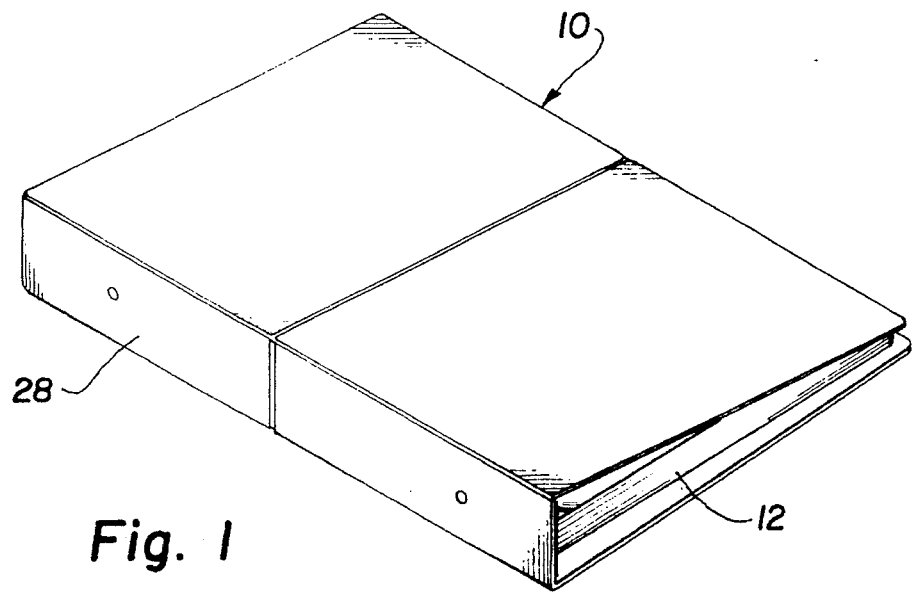
FIG. 1 is a perspective view of the coupon organizer of the present invention in a folded condition for ready transport or storage of the organizer.
Figure 2:
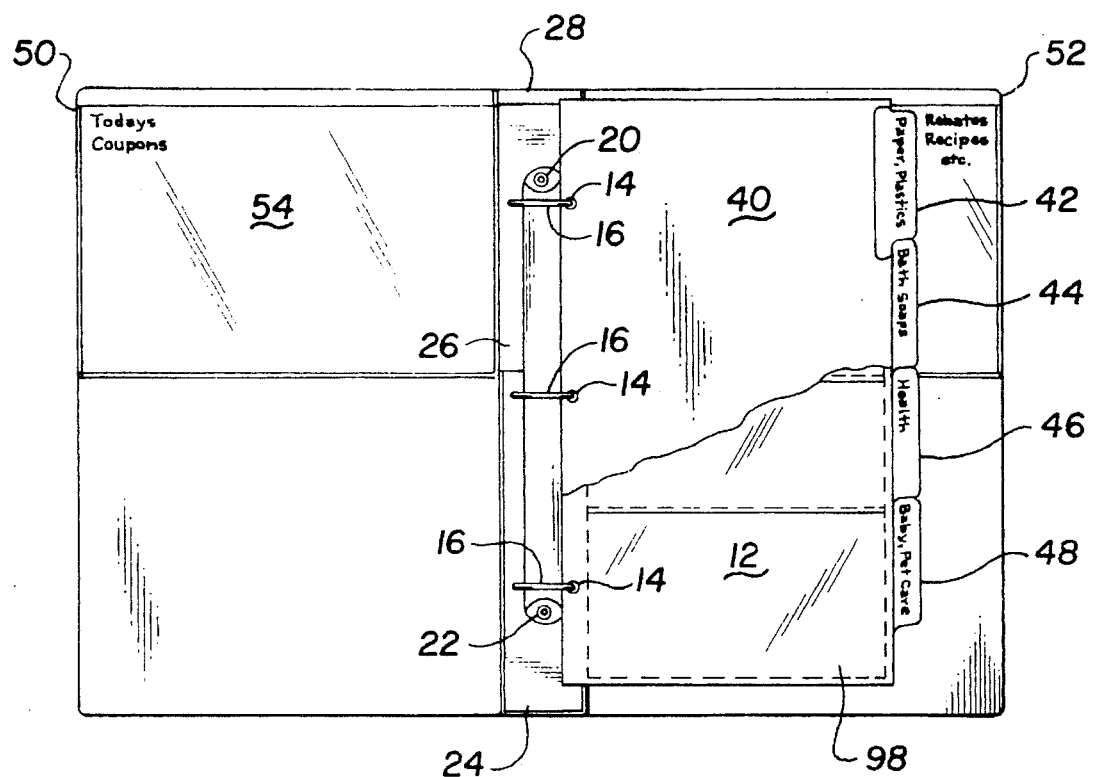
FIG. 2 is a plan view of the coupon organizer of the present invention illustrating the organizer in an open condition exposing the plastic sheets for receiving or removing discount coupons.
Figure 3:
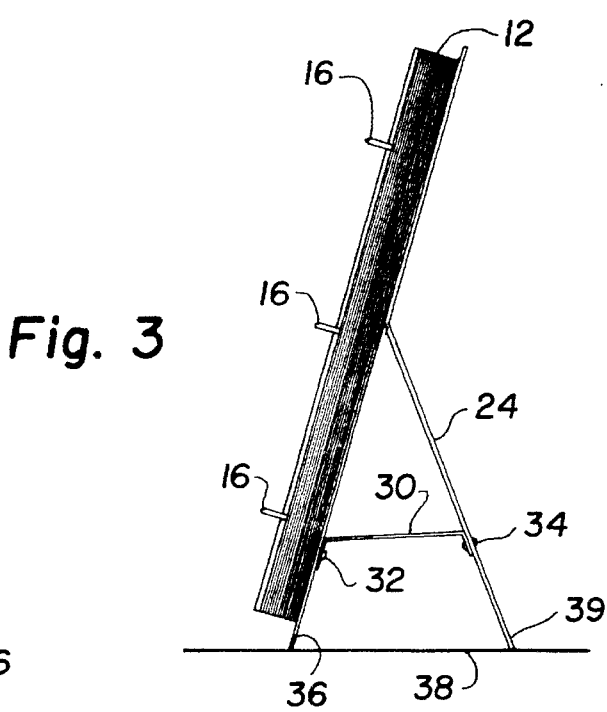
FIG. 3 illustrates structure of the coupon organizer of the present invention which provides for a free-standing mode.

Referring now to FIGS. 1, 2, and 3, the coupon organizer of the present invention is shown comprised of a notebook 10 of the break-back type containing a plurality of plastic sheets 12 provided with apertures 14 to be received by snap rings 16 which are mounted onto a rigid metal strip 18. The strip 18 is in turn secured at its upper end to the notebook 10 by way of rivet 20. A lower end of the strip 18 is secured by way of rivet 22 to a semi-rigid non-metallic strip 24, an upper end of which is received by sleeve 26 secured to an upper portion 28 of the back of the notebook 10. A flexible strap 30 is secured at one end to a lower portion of the back of the notebook 10 by way of rivet 22. The opposite end of the strap 30 is secured to the semi-rigid strip 24 by way of rivet 24. The function of the strap 30 is to limit the movement of the semi-rigid strip 24 when it is moved to an open position as when notebook 10 is in a break-back condition as shown in FIG. 3. When in this condition the notebook 10 may be supported on a flat surface 38 with a lower edge 36 of the notebook and a lower edge 39 of the strip 24 in contact the flat surface 38. In this free-standing mode, the plastic pages 12 are readily moved on the rings 16 to load or to remove coupons from a pocket 98 formed on the plastic page 12.

Figure 4:
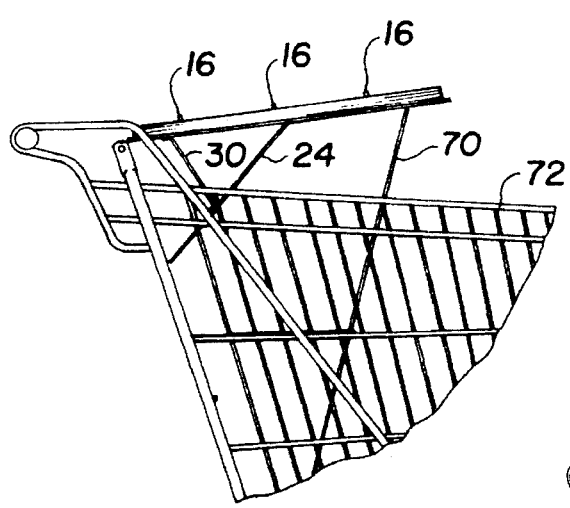
FIG. 4 illustrates the coupon organizer of the present invention supported on a folded-down child seat of a grocery shopping cart.
Figure 5:
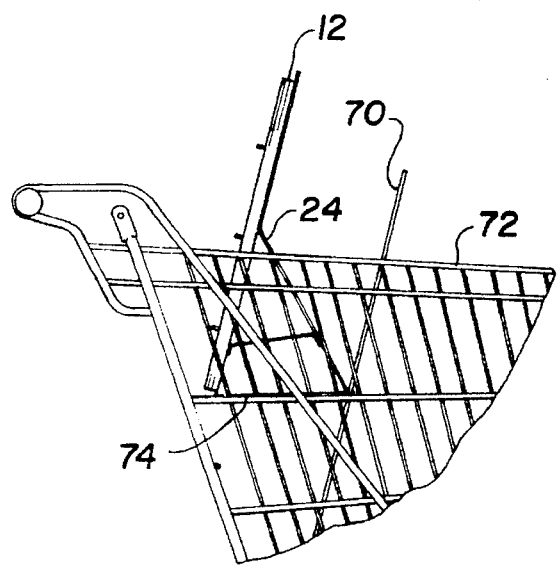
FIG. 5 illustrates the coupon organizer of the present invention supported upon the base of a folded-down child seat of a grocery shopping cart.

In the break-back mode the coupon organizer fits conveniently over a folded down child seat 70 of a grocery shopping cart 72 as shown in FIG. 4. Personal belongings (not shown) may be placed in a protected position beneath the organizer. An alternative position of the organizer within the shopping cart 72 is shown in FIG. 5. There the coupon organizer rests upon a base 74 of the child seat 70 with the pages 12 oriented in a substantially vertical position.

Formed on the upper inside portions of the covers 50 and 52 of the notebook 10 are pockets 54 and 56. The pockets 54 and 56 are formed by clear pieces of plastic bonded on three sides to the inside surfaces of covers 50 and 52 by a suitable adhesive. The pocket 54 may be labeled "Today's Coupons" for storing coupons as they are pulled from the pockets 12 when selecting an item. Thus the coupons are neatly stored and ready for use at the store check out. The other pocket 56 may be labeled "Rebates, Recipes, Shopping List and Misc." Pocket 56 is large enough to receive a check book, car keys, drivers license and pen, thus making it unnecessary for the shopper to carry a purse into the store.

The plastic pages 12 are separated into groups of commodities by separators 40 provided with tabs 42, 44, 46 and 48, identifying the generic contents of each group. Each of the tabs 42, 44, 46 and 48 is labeled to render it convenient to select a commodity group. The number of separators 40 and tabs 42, 44, 46 and 48 may be varied depending upon the number of groups into which the coupons to be divided.

Figure 6:
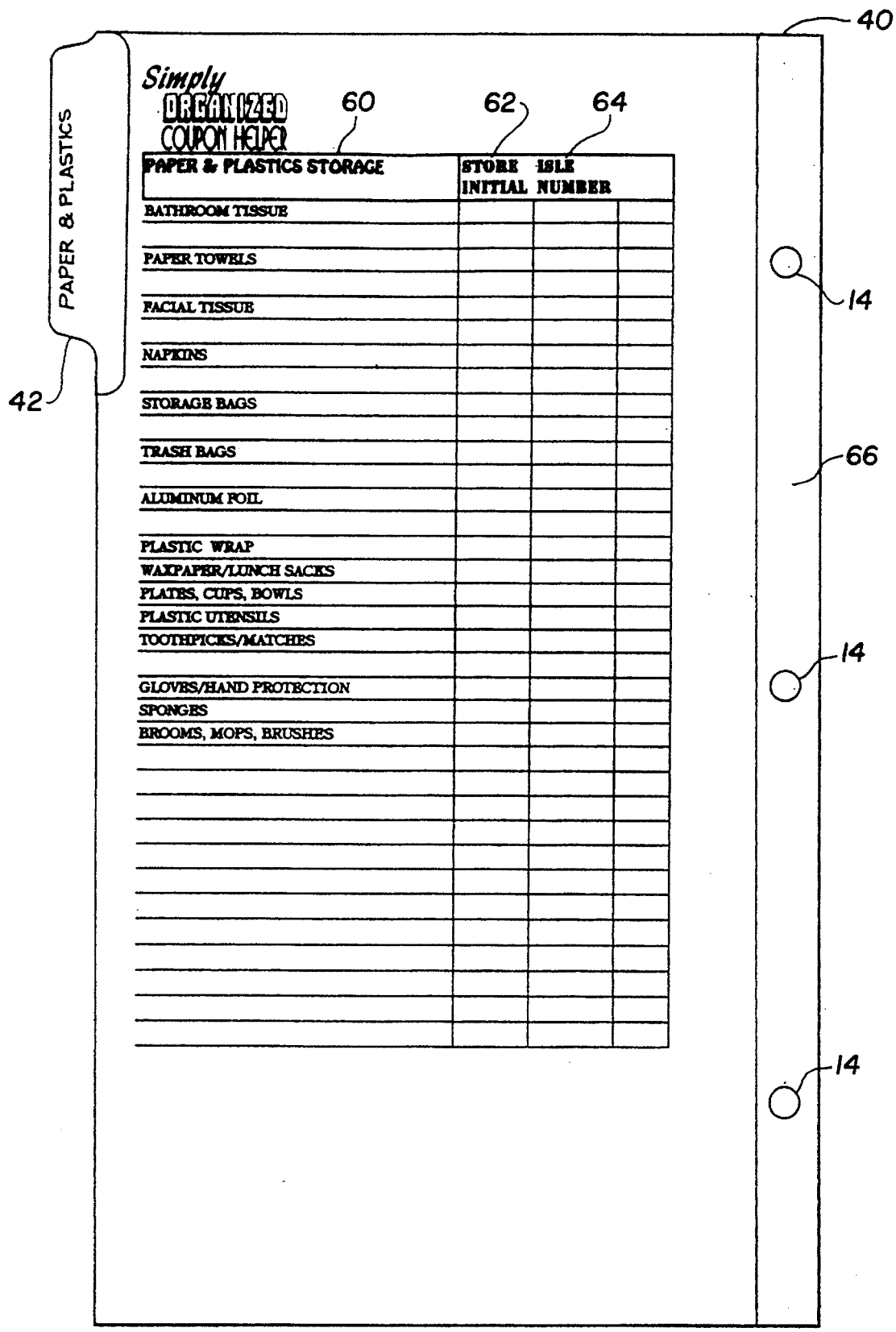
FIG. 6 illustrates a separator useful in the present invention for gathering discount coupons into groups.

A typical separator 40 is illustrated in FIG. 6. Separator 40 includes the labeled tab 42. In column 60 there are imprinted specific items that fall within the generic title of "paper and plastics." Blank spaces are available near the bottom of column 60 for hand imprinting items which may fall within the class. Column 62 provides space for identifying store which will be utilized by the customer, typically the store initials will be hand written in column 62 and column 64 be utilized to identify the aisle within the store identified in column 62 where the specific items listed in column 60 are to be found. The foregoing information makes it very convenient for a customer to locate the item or items listed in column 60 in the store identified in column 62. The column 62 may be divided vertically to provide information concerning another store at which the customer may desire to do shopping and the particular isle numbers for that store would be included in a second column provided in the column 64. Each of the stiff paper separators 40 is provided with a plastic reinforcing strip 66 to reinforce the material surrounding the aperture 14 in order to reduce tearing of the separator 40 when in use.

Figure 7:
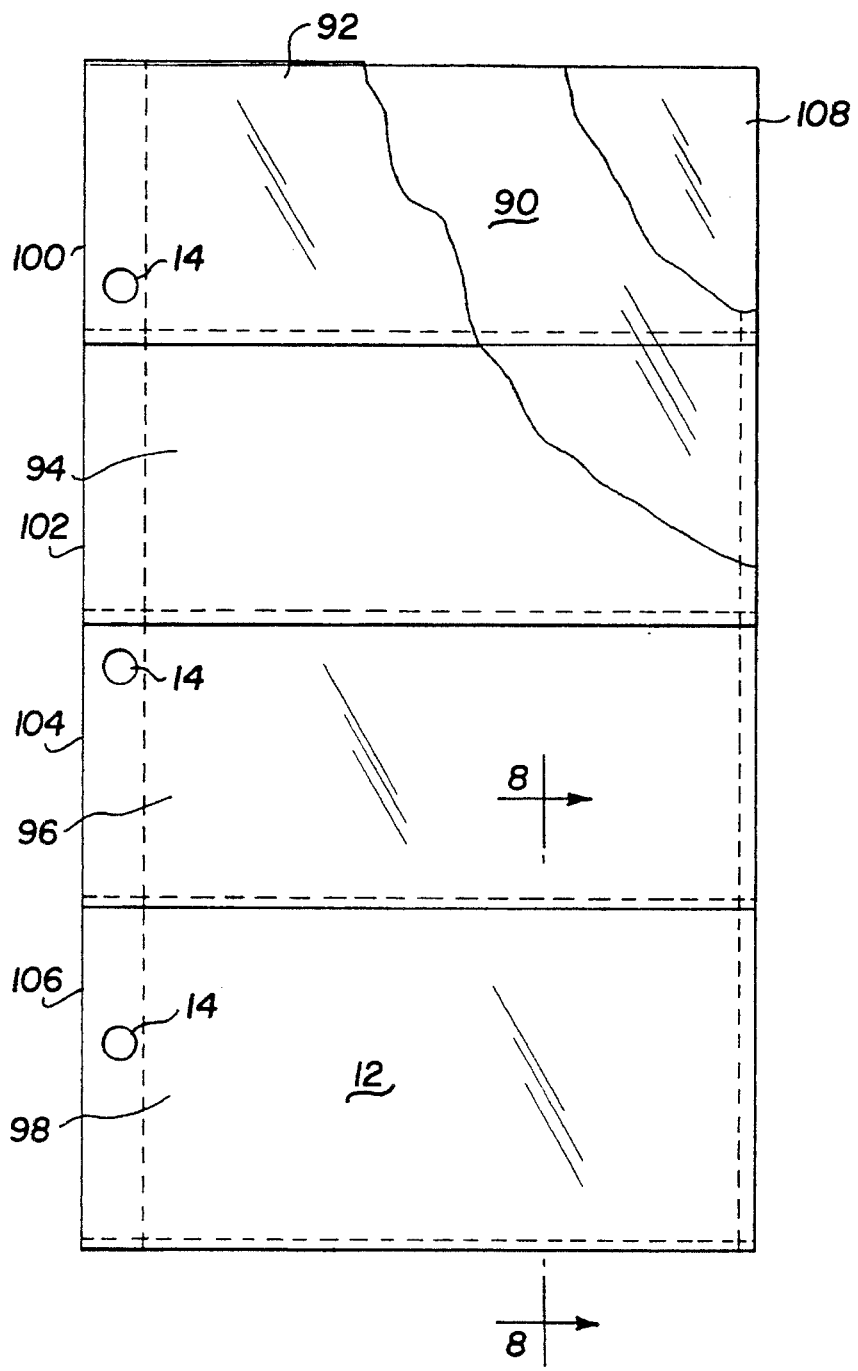
FIG. 7 illustrates a clear plastic sheet provided on both sides with pockets for receiving and viewing discount coupons.
Figure 8:
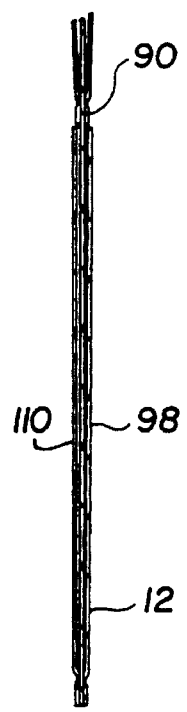
FIG. 8 is a partial enlarged cross section of a plastic pocketed sheet taken along line 8—8 of FIG. 7.

Referring now to FIGS. 7 and 8 where details of the plastic pages 12 are illustrated. Each page 12 is comprised of a central or core sheet 90 of at least eight (8) gauge polyethylene or polypropylene material. The core sheet 90 is a single piece or sheet defining the height and width of the page 12. The sheet 90 may be opaque or colored. Pockets 92, 94, 96 and 98 are formed on one side of the central or core sheet 90 by utilizing transparent sheets of at least eight (8) gauge polyethylene or polypropylene material heat sealed on each side and at the bottom. The top of each pocket is open to receive discount coupons. The bottom pocket 98 is made larger than the pockets 92, 94 and 96 to receive larger sized coupons. Edges 100, 102, 104 and 106 are heat sealed to the central or core sheet 90 and apertures 14 are provided to be received by the rings 16 of the notebook 10.

similar pockets are provided on the opposite side of the central or core sheet 90, one of which, a pocket 108, is partially illustrated. A pocket 110 is illustrated in FIG. 8. Accordingly, each sheet 12 is provided with a total of eight (8) pockets, four (4) on one side and four (4) on the other.

Now that details of the invention have been described modifications will occur to those skilled in the art and it is intended to cover such modifications as fall within the scope of the appended claims. Further other use of the organizer is contemplated other than the storage of discount coupons. For example the organizer may be utilized to arrange through an organized fashion dry cleaning discount coupons, coupons for entertainment, etc.

What is claimed is:

1. A coupon organizer for storing and displaying discount coupons redeemable at grocery stores comprising;

a break-back notebook having a back and two sides and configured when in an open condition to fit within a child seat of a grocery shopping cart, multi-ring structure mounted to said back of said notebook, a plurality of plastic sheets supported on said ring structure and each provided on both sides with clear plastic pockets for receiving and viewing discount coupons, said notebook sides and back divided into upper and lower portions which are at least partially foldable upon each other, said ring structure being secured only to said upper portion of said back, and a narrow, flexible strap connecting a lower portion of said ring structure with said lower portion of said back to limit relative movement between said ring structure and said lower portion of said back to form a rigid structure permitting said organizer to stand substantially Upright on a level surface.

2. The coupon organizer of claim 1 including hard paper separators to divide said plastic sheets into groups and imprinted with selected names of items available at grocery stores, coupons for which can be inserted in said plastic sheets in a group behind a hard paper separator.

3. The coupon organizer of claim 1 including a clear plastic pocket attached to an inside surface of one of said covers for receiving coupons related to goods selected while shopping in a grocery store.

4. The coupon organizer of claim 3 in which said clear plastic pocket is open at its top and extends entirely across the inside surface of said one of said covers for receiving coupons related to goods selected while shopping in a grocery store.

5. The coupon organizer of claim 1 in which four plastic pockets are provided on each side of each of said plastic sheets, said plastic pockets being open at their tops and a lowest pocket being larger than the other pockets.

\* \* \* \* \*